J. LAWRENCE.
DOMESTIC COOKER.
APPLICATION FILED DEC. 16, 1909.

1,069,440.

Patented Aug. 5, 1913.

Witnesses
B. V. Sommers
May Ellis.

Inventor
James Lawrence
By Henry Orth Jr.
Attorney

UNITED STATES PATENT OFFICE.

JAMES LAWRENCE, OF NEW YORK, N. Y., ASSIGNOR TO ELECTRIC HEAT STORAGE COMPANY, A CORPORATION OF NEW YORK.

DOMESTIC COOKER.

1,069,440.   Specification of Letters Patent.   Patented Aug. 5, 1913.

Application filed December 16, 1909. Serial No. 533,412.

*To all whom it may concern:*

Be it known that I, JAMES LAWRENCE, a subject of the King of Great Britain, residing at New York city, county and State of New York, United States of America, have invented certain new and useful Improvements in Domestic Cookers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to cookers for domestic use and has for its object to provide a simple and efficient means for cooking food that is heated by electricity and capable of accumulating heat and utilizing such accumulated heat for cooking purposes after the electric current has been cut off, together with details of construction hereinafter described and claimed.

Figure 1:
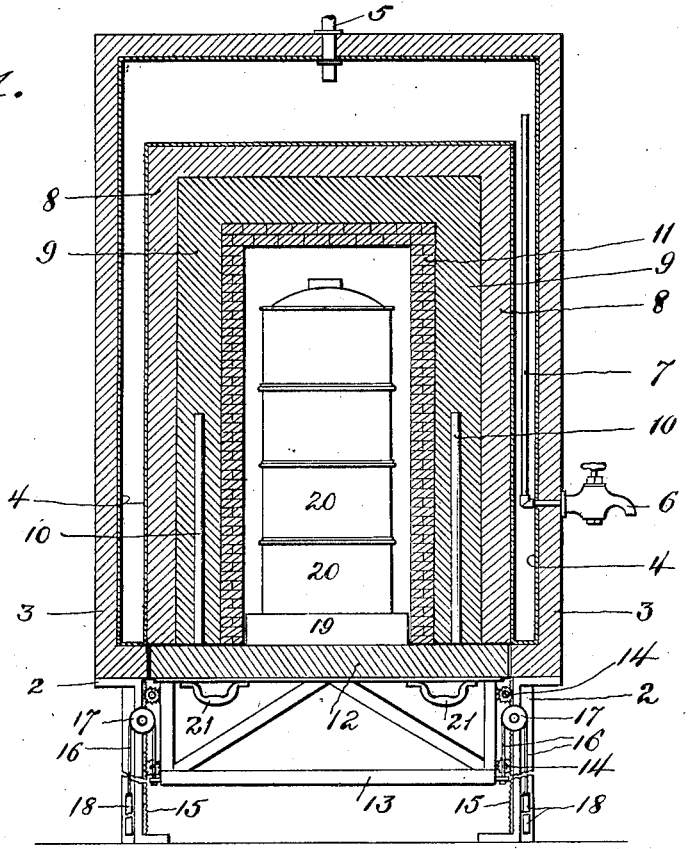
Figure 2:
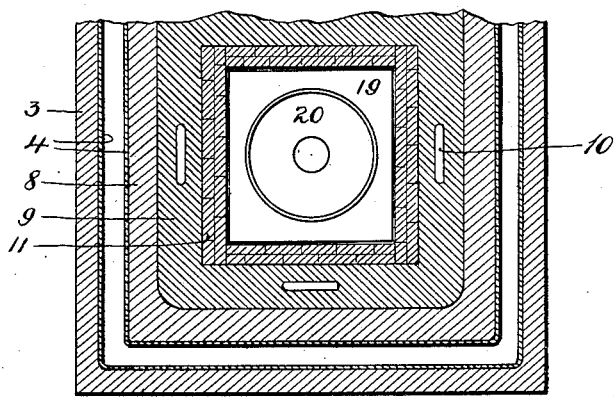

Referring to the drawings in which like parts are similarly designated, Figure 1 is a vertical longitudinal section of the cooker showing parts in elevation. Fig. 2 is a horizontal section thereof.

The cooker comprises a frame 2 on which is supported an insulating casing 3 surrounding an inverted box-like water tank 4. This tank has a water inlet 5 from a service main or other water supply and an outlet cock 6 outside the cooker secured on the end of a draw-off pipe 7 extending to the interior and near the top of the water tank. The water tank is lined as shown at 8 with insulating material and within the lining is a heat accumulator 9 comprising a substantially rectangular inverted box-like block of iron having inserted therein electric heaters 10. Iron is preferably used since, as is well known, it possesses the property of high specific heat, as compared with most of the metals. It also has good heat conductivity, as compared with substances like soapstone, for example, which has heretofore been used to store heat. This block of iron is closed at the top and open at the bottom and is provided with a fire-brick or other insulating lining 11 on its interior. The bottom of the accumulator and cooker is closed by an insulating plate 12 supported on a vertically movable frame 13 guided by pinions 14 engaging a rack 15 on the frame 2. The frame 13 is connected at each side to one or more ropes, chains or the like 16 passing over pulleys 17 and counterbalanced by a weight 18. On the insulating plate 12 is a block 19, preferably of insulating material on which the cooking utensils 20 are placed. Handles 21 serve to pull the insulating plate 12 down to remove the cooking utensils from the cooker or oven.

The operation is as follows: The heat accumulator is heated by electric heating devices of any desired type as indicated at 10. These heating devices are relatively small compared to the volume of metal 9 to be heated and are designed to be in operation at such times during the day, when the maximum load is not on the electric circuit and when the maximum load is on the electric mains, may be cut out, either automatically or otherwise, by any well known type of cut out. The consequences will be that the heat will be stored in the insulated accumulator 9 so that it will be ready for cooking at any time and it will simply be necessary to pull down on the handles 21, lower the counterbalanced bottom 12 and place the cooking utensils on the block 19. The opening of the cooker by pulling down the door or plate 12 does not materially cool the cooking chamber contained therein for the reason that this chamber entraps the heated air that has a tendency to rise. Any heat that escapes through the insulation 8 will be utilized in the heating water in the tank 4.

I claim:

1. An electric cooker, comprising an inclosed air cooking-chamber capable of receiving articles to be cooked, said chamber having a surrounding mass of metal of large heat storage capacity capable of storing heat and imparting the stored heat to heat the air chamber for cooking purposes and an electric heater for applying electric energy to said mass to be stored therein for subsequent use.

2. An electric cooker comprising an inclosed air cooking-chamber capable of receiving articles to be cooked, a heat accumulator around the chamber consisting of a mass of metal of large heat storage capacity capable of storing heat and imparting the stored heat to heat the air chamber for cooking purposes and an electric heater of small capacity for heating said mass.

3. An electric cooker comprising an inclosed air cooking-chamber capable of receiving articles to be cooked, a heat accumulator consisting of a mass of metal of large heat storing capacity capable of storing heat and imparting the stored heat to heat the air chamber for cooking purposes, and an electric heater for heating said mass.

4. An electric cooker comprising a heat accumulator of large heat storage capacity capable of storing heat and having an air inclosed cooking-chamber therein for the articles to be cooked, and means to electrically heat said accumulator to supply the heat to be stored therein, whereby the cooking operation is independent of the time of application of the electric energy.

5. An electric cooker comprising a mass of metal adapted to store heat and having an air-cooking chamber therein open at the bottom adapted to receive its heat from said storage mass, means to electrically heat the mass, and means to close the bottom.

6. An electric cooker comprising a heat accumulator capable of storing heat and having an air cooking-chamber formed therein open at the bottom adapted to receive its heat from said heat accumulator, electric heating means to supply heat to the accumulator and a closure for said chamber movable to and from the bottom.

7. A cooker comprising a stationary heat accumulator having a cooking chamber therein, an external and internal insulating coating for the accumulator, electrical heating units arranged within the accumulator to heat the same and a vertically movable door on which the cooking utensils are adapted to be supported.

8. A cooker comprising a stationary heat accumulator having a cooking chamber therein closed at its top and open at its bottom, an external and an internal insulating coating for the accumulator, a water chamber surrounding the external coating, an insulating coating for the water chamber, a vertically movable counterbalanced door for the cooking chamber on which the cooking utensils are adapted to be supported, and electrical means to supply the heat to be stored in said accumulator.

9. An electric cooker, comprising a stationary heat accumulator capable of storing a large quantity of heat and having an internal cooking chamber open at the bottom adapted to receive its heat from said heat accumulator, a vertically movable counterbalanced closure for the bottom of said chamber, and electrical heating devices in the accumulator to supply heat thereto.

10. The combination of a heat storage mass of high specific heat and good heat conductivity, means associated therewith for heating it, and a cooking chamber adapted to be heated by said storage mass.

11. A cooker containing a cooking chamber and a heat storage mass of high specific heat and good heat conductivity surrounding the chamber and adapted to heat it, and means to heat the said mass.

12. A cooker containing a cooking chamber and a heat storage mass of high specific heat and good heat conductivity surrounding the chamber and adapted to heat it, and electric means for heating the said mass.

13. The combination of a cooker containing an inclosed cooking chamber, a heat storage mass of high specific heat and good heat conductivity surrounding the chamber and forming part of its inclosing walls and adapted to receive and store heat and to impart it to the cooking-chamber to heat the latter for cooking purposes, and a removable door also forming part of the inclosing walls and adapted to be removed and replaced to permit the insertion and removal of articles into and from the cooking chamber.

14. The combination of a heat storage mass, means for heating it, and a cooking chamber adapted to be heated by said storage mass and lined with a heat refractory material forming part of the heat storage mass.

15. A cooker containing a cooking chamber lined with a heat refractory material and having a heat storage mass surrounding the chamber and its lining and adapted to heat them, and electric means for heating the said mass.

16. An electric cooking apparatus consisting of a heat-insulated heat accumulator of a mass having high specific heat and good heat conductivity, capable of storing a large amount of heat and of parting with it rapidly, a cooking chamber connected with and adapted to be heated by the heat accumulator, and electric means to heat the heat accumulator at a slower rate than the heat consumption during cooking operations.

17. An electric cooking apparatus comprising a heat-insulated heat accumulator made of a mass having high specific heat and good heat conductivity and capable of storing a large amount of heat and of quickly parting with its heat, an electric heating element for heating the heat accumulator, and a cooking chamber adapted to be heated by said heat accumulator.

18. An electric cooking apparatus comprising a heat-insulated heat accumulator made of a solid mass having high specific heat and good heat conductivity and capable of storing a large amount of heat and of quickly parting with its heat, an electric heating element for heating the heat accumulator, and a cooking chamber inclosed by
5 said heat accumulator and adapted to be heated by it.

In testimony that I claim the foregoing as my invention, I have signed my name in presence of two subscribing witnesses.

JAMES LAWRENCE.

Witnesses:
G. J. LILLIAN NICHOLSON,
LAURA E. SMITH.